(12) United States Patent
Zeng et al.

(10) Patent No.: US 12,474,106 B2
(45) Date of Patent: Nov. 18, 2025

(54) REFRIGERATION DEVICE

(71) Applicant: SHENZHEN ENVICOOL TECHNOLOGY CO., LTD., Guangdong (CN)

(72) Inventors: Qingzhen Zeng, Guangdong (CN); Wenbing Zhou, Guangdong (CN); Tao Xu, Guangdong (CN); Benyu Jing, Guangdong (CN)

(73) Assignee: SHENZHEN ENVICOOL TECHNOLOGY CO., LTD., Guangdong (CN)

( * ) Notice: Subject to any disclaimer, the term of this patent is extended or adjusted under 35 U.S.C. 154(b) by 224 days.

(21) Appl. No.: 18/217,525

(22) Filed: Jun. 30, 2023

(65) Prior Publication Data

US 2024/0003610 A1 Jan. 4, 2024

(30) Foreign Application Priority Data

Jun. 30, 2022 (CN) .......................... 202221671354.5

(51) Int. Cl.
  *F25D 17/02* (2006.01)
  *F25B 41/40* (2021.01)
  *F25D 23/00* (2006.01)

(52) U.S. Cl.
  CPC .............. *F25D 17/02* (2013.01); *F25B 41/40* (2021.01); *F25D 23/00* (2013.01); *F25D 2323/00281* (2013.01); *Y02E 60/10* (2013.01)

(58) Field of Classification Search
  CPC ........ F25D 17/02; F25D 23/00; F25D 23/003; F25D 23/006; H05K 7/20272; F25B 41/40; F25B 25/005
  See application file for complete search history.

(56) References Cited

U.S. PATENT DOCUMENTS

| | | | | |
|---|---|---|---|---|
| 4,729,424 A * | 3/1988 | Mizuno | ..................... | G06F 1/20 174/15.1 |
| 5,937,663 A * | 8/1999 | Chen | ......................... | F24H 4/04 62/238.7 |
| 7,836,714 B2 * | 11/2010 | Carlson | ................ | B01D 53/265 62/506 |
| 9,062,909 B2 * | 6/2015 | Lu | ........................... | F25D 17/06 |
| 11,655,999 B2 * | 5/2023 | Davtyan | ................ | F24F 1/032 62/426 |

(Continued)

*Primary Examiner* — Christopher R Zerphey
(74) *Attorney, Agent, or Firm* — Yue (Robert) Xu; Apex Attorneys at Law, LLP (57) ABSTRACT

A refrigeration device includes an outer frame box, a refrigerant system, a cooling liquid system, a heat exchanger and a fan assembly. The refrigerant system and the cooling liquid system are connected to the heat exchanger, and the refrigerant and the cooling liquid exchange heat in the heat exchanger. The fan assembly is configured to provide power for the flow of airflow in the outer frame box. The cooling liquid system, the heat exchanger, the refrigerant system and the fan assembly are sequentially arranged in the outer frame box along a flow direction of the airflow. The layout of the cooling liquid system, the heat exchanger, the refrigerant system and the fan assembly in the outer frame box is reasonable, so that the cooling liquid system, the heat exchanger, the refrigerant system and the fan assembly can form a compact layout in the outer frame box.

18 Claims, 8 Drawing Sheets

(56) References Cited

U.S. PATENT DOCUMENTS

| | | | |
|---|---|---|---|
| 11,821,681 B2 * | 11/2023 | Cleland | B67D 1/0884 |
| 2007/0125108 A1 * | 6/2007 | Lenko | A63C 19/10 |
| | | | 62/235 |
| 2007/0130977 A1 * | 6/2007 | Chou | F25B 41/20 |
| | | | 62/238.6 |
| 2009/0241577 A1 * | 10/2009 | Fukushima | F25B 49/005 |
| | | | 700/275 |
| 2023/0384026 A1 * | 11/2023 | Li | F25D 31/002 |

* cited by examiner

REFRIGERATION DEVICE

CROSS REFERENCE TO RELATED APPLICATIONS

The present application claims priority to Chinese Patent Application No. 202221671354.5, titled "REFRIGERATION DEVICE", filed on Jun. 30, 2022 with the China National Intellectual Property Administration, which is incorporated herein by reference in its entirety.

FIELD

The present application relates to the technical field of refrigeration equipment, and in particular to a refrigeration device.

BACKGROUND

In the conventional technology, when a battery pack is cooled, heat is generally dissipated by air cooling forced convection. However, it is difficult to cool the inside of the battery pack by the traditional air conditioner with air ducts for air cooling, and it is difficult to uniformly disperse the air flow, resulting in a certain dead zone. When the temperature of the surface of the battery is too high, the temperature inside the battery often exceeds a permission upper limit, which may easily affect the normal use and the lifespan of the battery pack.

In the process of implementing the present application, the inventor found at least the following problems in the conventional technology: for a 300 kW-400 kW lithium battery energy storage integrated system, the layout of components in the liquid cooling module in the conventional technology is unreasonable, resulting in a large size of the unit, and for the form of single-cabinet application of the energy storage system, it results in a relatively large overall integrated system and occupies a relatively large area.

To sum up, how to provide a refrigeration device with a compact structure and a reasonable layout is an urgent problem to be solved by those skilled in the art.

SUMMARY

In view of this, the purpose of the present application is to provide a refrigeration device, in which a cooling liquid system, a heat exchanger, a refrigerant system and a fan assembly are sequentially arranged in an outer frame box along a flow direction of airflow in the outer frame box, which can make the structure of the refrigeration device compact and the interior layout relatively reasonable.

In order to achieve the above object, the present application provides the following technical solutions.

A refrigeration device includes:
an outer frame box;
a refrigerant system, specifically, a refrigerant circulates in the refrigerant system;
a cooling liquid system, specifically, a cooling liquid flows through a heating component and circulates in the cooling liquid system;
a heat exchanger, specifically, the refrigerant system and the cooling liquid system are connected to the heat exchanger, and the refrigerant and the cooling liquid exchange heat in the heat exchanger;
a fan assembly configured to provide power for a flow of airflow in the outer frame box;

and the cooling liquid system, the heat exchanger, the refrigerant system and the fan assembly are sequentially arranged in the outer frame box along a flow direction of the airflow in the outer frame box.

Optionally, an air inlet is arranged in a first end face of the outer frame box, and an air outlet is arranged in a second end face of the outer frame box;
the cooling liquid system, the heat exchanger, the refrigerant system and a fan assembly are sequentially arranged from the air inlet to the air outlet along the flow direction of the airflow.

Optionally, the cooling liquid system is arranged close to the air inlet of the first end face, and the fan assembly is arranged close to the air outlet of the second end face.

Optionally, the air outlet occupies entire second end face of the entire outer frame box,
and/or, the fan assembly includes at least two fans arranged along a height direction of the outer frame box, and the at least two fans are uniformly distributed in the height direction of the outer frame box.

Optionally, the heat exchanger is arranged in an upper-middle part of the outer frame box, and projections of the cooling liquid system and the refrigerant system to a bottom surface of the outer frame box overlap a projection of the heat exchanger to the bottom surface of the outer frame box.

Optionally, the refrigeration device further includes an electrical control module, and the electrical control module is detachably arranged at a top of the outer frame box.

Optionally, an outer surface of the electrical control module is covered with a cover plate.

Optionally, the cooling liquid system includes a water pump, a heater, an expansion tank arranged at a water inlet end of the water pump, and connection pipelines, and the heat exchanger is connected between a water outlet end of the water pump and a water inlet end of the heater.

Optionally, multiple chucks, multiple clamps, and a sealing gasket are arranged at each joint of the connection pipelines, the multiple chucks cooperate with the multiple clamps, and the sealing gasket is arranged between the multiple chucks which are in a butt-connection.

Optionally, the outer frame box is made of aluminum plate material;
and/or, the connection pipelines in the cooling liquid system are aluminum pipes.

In the process of using the refrigeration device provided by the present application, the cooling liquid in the cooling liquid system flows through the heating component, and absorbs the heat of the heating component, which increases the temperature of the cooling liquid. The cooling liquid circulates in the cooling liquid system. When the cooling liquid flows through the heat exchanger, it exchange heat with the refrigerant flowing through the heat exchanger, causing the temperature of the cooling liquid to decrease. The refrigerant circulates in the refrigerant system. The fan assembly creates an air flow in the outer frame box, which is beneficial for the refrigerant system and the cooling liquid system to exchange heat with the external environment and further improves the effect of heat dissipation of the refrigeration device.

Compared to the conventional technology, the present application at least includes the following beneficial effects:
by sequentially arranging the cooling liquid system, the heat exchanger, the refrigerant system and the fan assembly in the outer frame box along the flow direction of the airflow, the areas are clearly distinguished, and the layout of the cooling liquid system, the heat exchanger, the refrigerant system and the fan assembly in the outer frame box is reasonable in a limited space, so that the cooling liquid system, the heat exchanger, the refrigerant system, and the fan assembly can form a compact layout in the outer frame box, which realizes a reasonable utilization of space and is beneficial for reducing the occupation area.

BRIEF DESCRIPTION OF THE DRAWINGS

In order to more clearly illustrate technical solutions in embodiments of the present application or in the conventional technology, the accompanying drawings required to be used in the description of the embodiments or in the conventional technology are briefly introduced below. Obviously, the accompanying drawings in the following description are only for the embodiments of the present application. For those skilled in the art, other drawings can be obtained based on the provided accompanying drawings without creative efforts.

In FIGS. 1 to 8:

1 outer frame box, 2 heat exchanger, 3 fan assembly, 4 air inlet, 5 air outlet, 6 electrical control module, 7 cover plate, 8 water pump, 9 heater, 10 expansion tank, 11 chuck, 12 compressor, 13 condenser, 14 electronic expansion valve, d first connection port, and e second connection port.

DETAILED DESCRIPTION OF EMBODIMENTS

The technical solutions in the embodiments of the present application are clearly and completely described below in conjunction with the accompanying drawings in the embodiments of the present application. Obviously, the described embodiments are only a part of the embodiments of the present application, not all of them. All other embodiments obtained by those skilled in the art based on the embodiments in the present application without creative efforts fall within the protection scope of the present application.

The core of the present application is to provide a refrigeration device, in which the cooling liquid system, the heat exchanger, the refrigerant system and the fan assembly are sequentially arranged in the outer frame box along a flow direction of airflow in the outer frame box, making the layout of the refrigeration device more reasonable and reducing the occupation area of the refrigeration device. Moreover, a negative pressure is formed in the space where the cooling liquid system, the heat exchanger and the refrigerant system are located, which is conducive to improving the effect of heat dissipation.

Reference is made to FIGS. 1 to 8.

Figure 1:
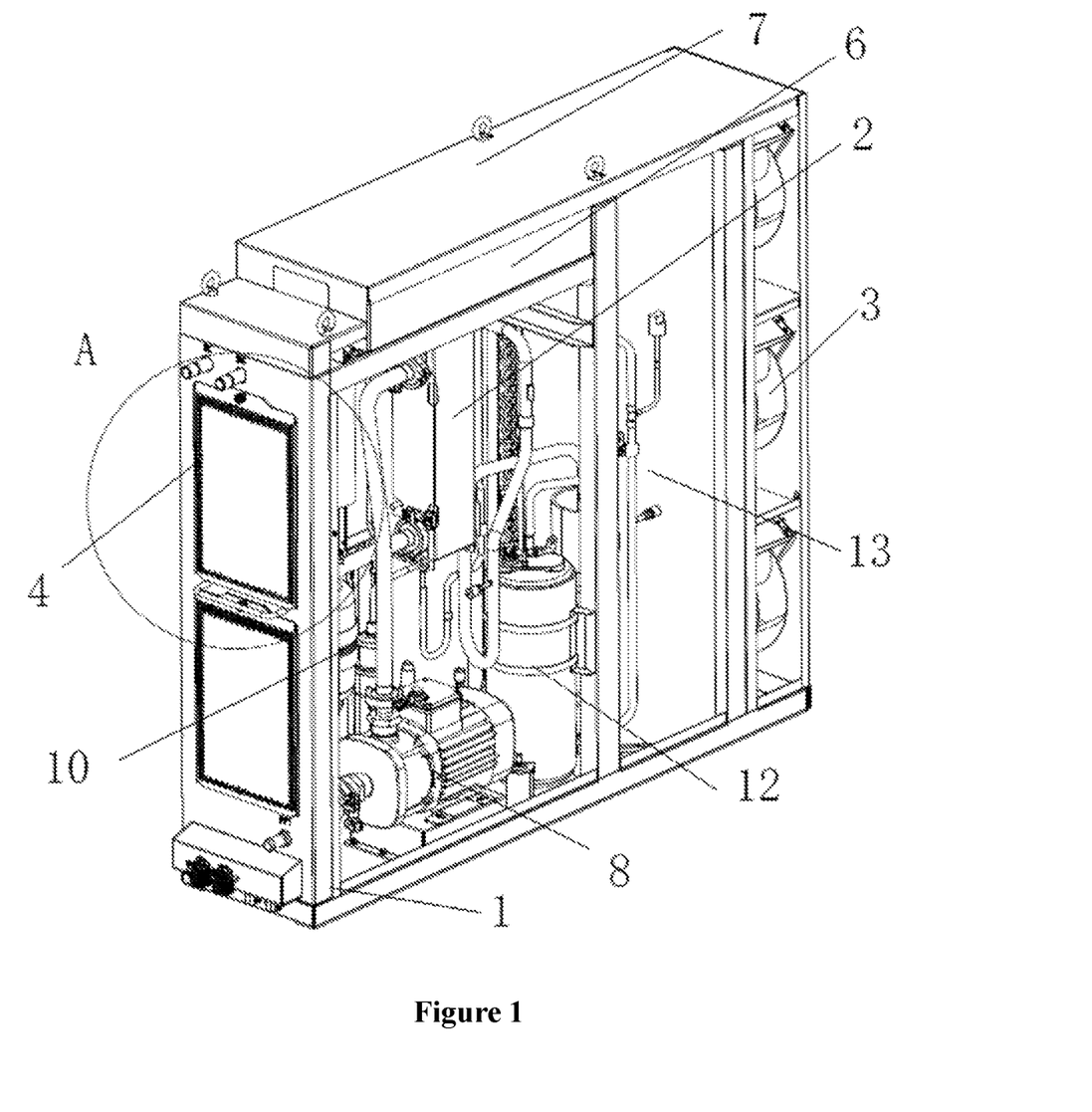
FIG. 1 is a structural schematic diagram of a refrigeration device according to a specific embodiment provided by the present application.

As shown in FIG. 1, a refrigeration device is provided by the specific embodiment, and the refrigeration device includes an outer frame box 1, a refrigerant system, a cooling liquid system, a heat exchanger 2, and a fan assembly 3, and a refrigerant circulates in the refrigerant system; a cooling liquid flows through a heating component and circulates in the cooling liquid system; the refrigerant system and the cooling liquid system are connected to the heat exchanger 2, and the refrigerant and the cooling liquid exchange heat in the heat exchanger 2; the fan assembly 3 is configured to provide power for a flow of airflow in the outer frame box 1; and the cooling liquid system, the heat exchanger 2, the refrigerant system and the fan assembly 3 are sequentially arranged in the outer frame box 1 along a flow direction of the airflow in the outer frame box 1.

Figure 4:
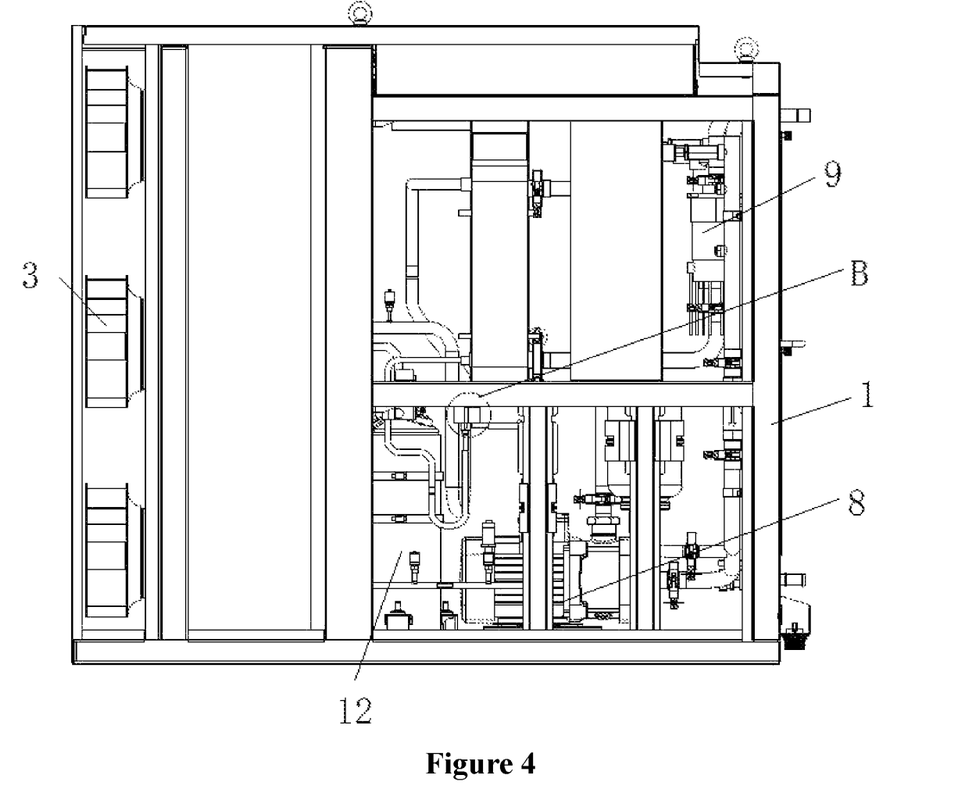
FIG. 4 is a back view of the refrigeration device in FIG. 1.
Figure 5:
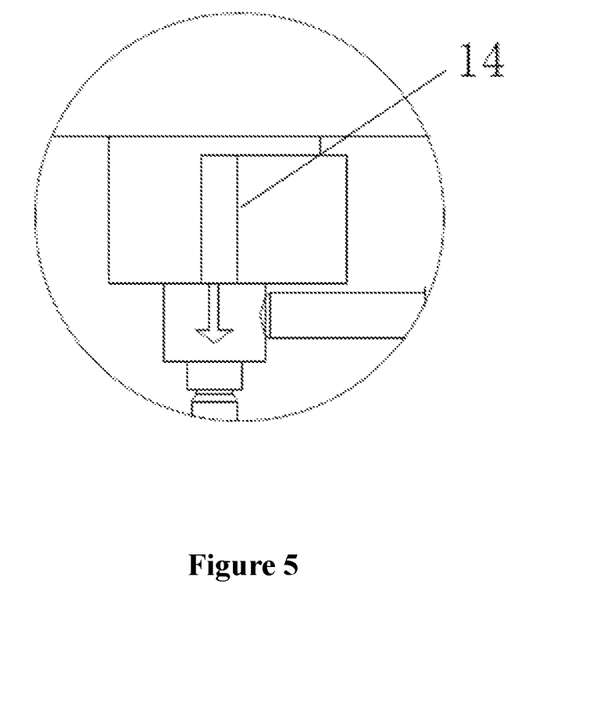
FIG. 5 is a local enlarged drawing of Part B in FIG. 4.

Specifically, as shown in FIGS. 1, 4 and 5, the refrigerant system may include a compressor 12, a condenser 13 and an electronic expansion valve 14. During use, the compressor 12 compresses the refrigerant, the condenser 13 condenses and liquefies the compressed refrigerant, and the electronic expansion valve 14 plays a role of throttling to adjust the flow quantity of the refrigerant per unit time in the refrigerant system. The refrigerant system may have other structures that meet the requirements, which is not repeated here.

The heat exchanger 2 may be a plate heat exchanger or other forms of heat exchangers, which is determined according to actual conditions.

During the process of using the refrigeration device provided in the specific embodiment, the cooling liquid in the cooling liquid system flows through the heating component, and absorbs the heat of the heating component, increasing the temperature of the cooling liquid. The cooling liquid circulates in the cooling liquid system. When the cooling liquid flows through the heat exchanger 2, it exchanges heat with the refrigerant flowing through the heat exchanger 2, thereby decreasing the temperature of the cooling liquid. The refrigerant circulates in the refrigerant system. The fan assembly 3 creates an air flow in the outer frame box 1, which is beneficial for the refrigerant system and the cooling liquid system to exchange heat with the external environment and further improves the effect of heat dissipation of the refrigeration device.

Compared to the conventional technology, in the specific embodiment, the cooling liquid system, the heat exchanger 2, the refrigerant system and the fan assembly 3 are sequentially arranged in the outer frame box 1 along the flow direction of the airflow in the outer frame box 1, so that the layout of the cooling liquid system, the heat exchanger 2, the refrigerant system and fan assembly 3 in the outer frame box 1 is relatively reasonable, and the areas are clearly distinguished, so that the cooling liquid system, the heat exchanger 2, the refrigerant system and the fan assembly 3 form a compact layout in the outer frame box 1, realizing a reasonable utilization of space and reducing the occupation area. In addition, the cooling liquid system, the heat exchanger 2 and the refrigerant system are arranged in a negative pressure zone, further improving the effect of heat dissipation.

Figure 6:
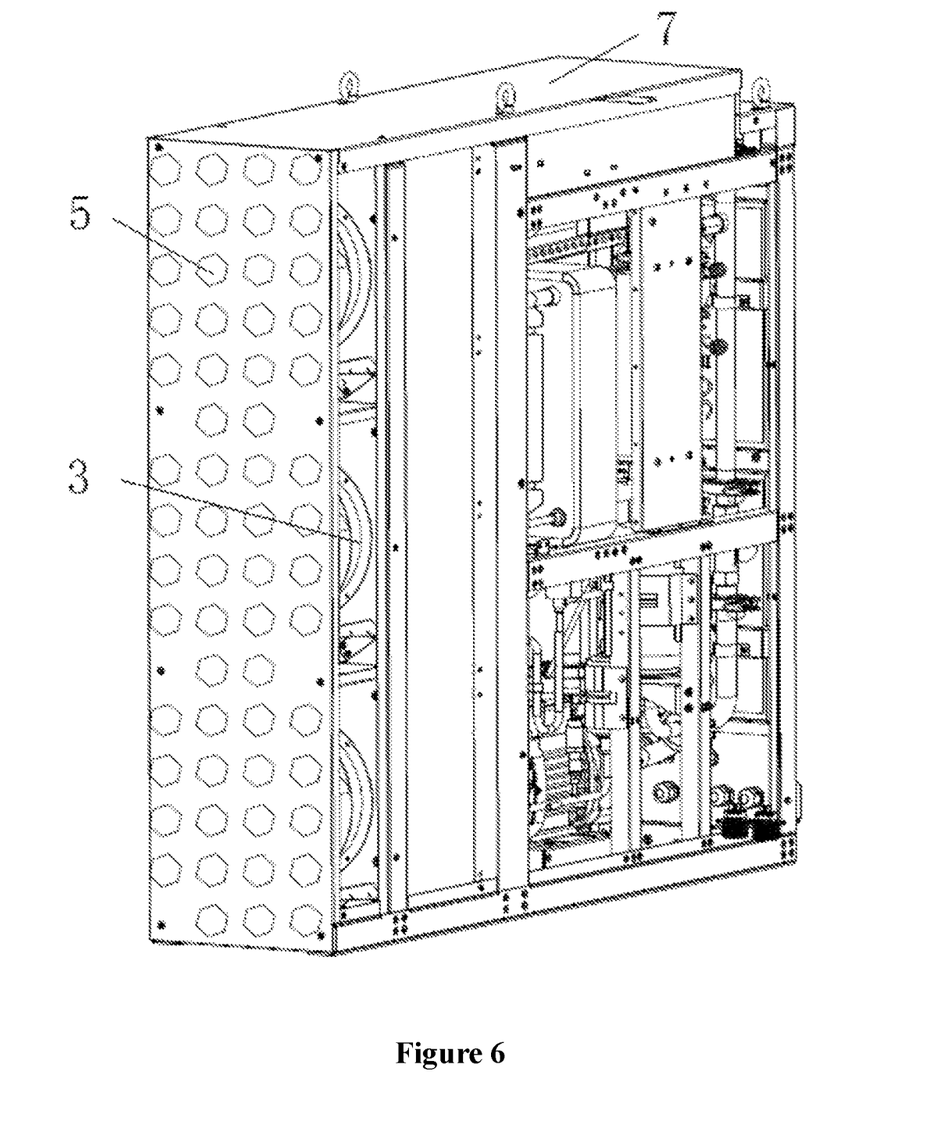
FIG. 6 is a structural schematic diagram of a refrigeration device according to a specific embodiment provided by the present application from another angle.

In a specific embodiment, an air inlet 4 is arranged in a first end face of the outer frame box 1 as shown in FIG. 1, and an air outlet 5 is arranged in a second end face of the outer frame box 1as shown in FIG. 6.

The cooling liquid system, the heat exchanger 2, the refrigerant system, and the fan assembly 3 are sequentially arranged from the first end face to the second end face along the flow direction of the airflow.

During use, the airflow enters from the air inlet 4, flows through the cooling liquid system, the heat exchanger 2 and the refrigerant system in sequence, and exits from the air outlets 5 through the fan assembly 3. A negative pressure is formed at the cooling liquid system, the heat exchanger 2 and the refrigerant system. The air path is set to enter from the front and exit from the back, so that the flow of the airflow is smoother, the resistance is reduced during the air flow process, and the loss of air is reduced.

The first end face and the second end face mentioned in the specific embodiment may be two opposite end faces of the outer frame box 1, or may be two adjacent end faces, or end faces that are spaced apart and not opposite to each other, depending on the actual situation.

The cooling liquid system may be arranged at a position close to the air inlet 4 in the first end face, and the fan assembly 3 may be arranged at a position close to the air outlet 5 in the second end face, so as to facilitate maintenance and replacement of the cooling liquid system and the fan assembly 3. In addition, the distance between the cooling liquid system and the fan assembly 3 may be increased as much as possible along the flow direction of the airflow, so that the space available for arranging the cooling liquid system, the heat exchanger 2, the refrigerant system and the fan assembly 3 in the outer frame box 1 is expanded, and the structure layout is relatively reasonable.

Figure 2:
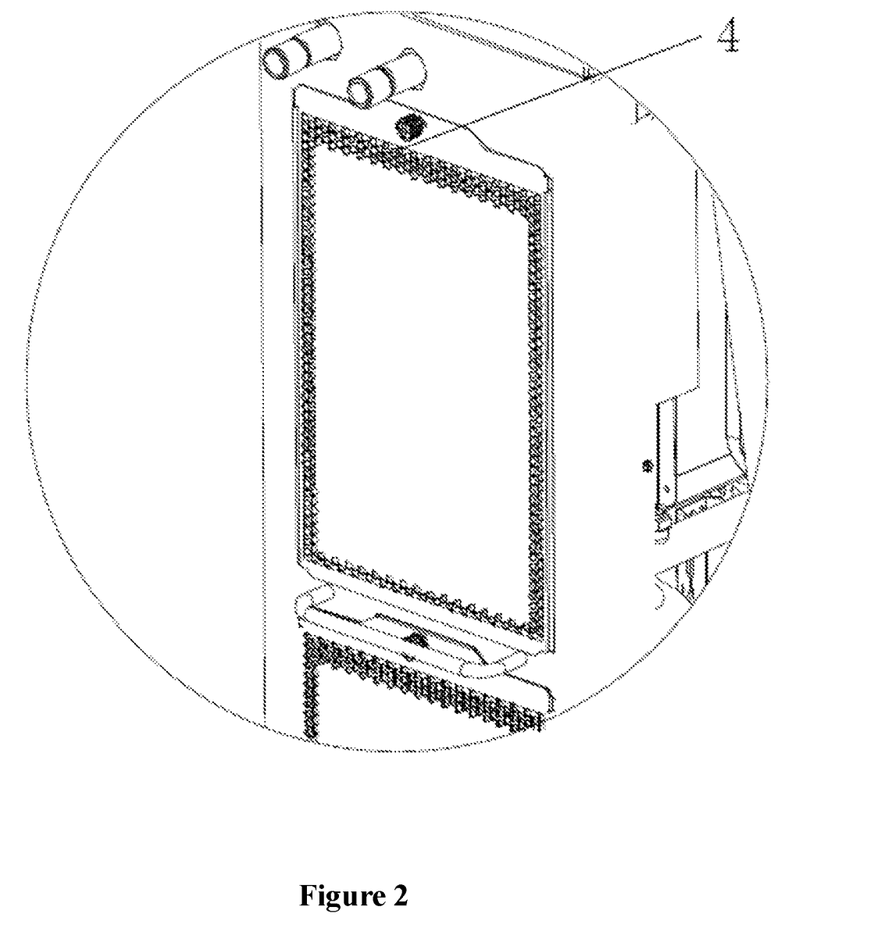
FIG. 2 is a local enlarged drawing of Part A in FIG. 1.

As shown in FIG. 2, the air inlet 4 in the first end face of the outer frame box 1 is required to stagger some parts in the process of arrangement. Therefore, the air inlet 4 may be arranged in a part of the first end face. As shown in FIG. 6, the air outlet 5 occupies the entire second end face. The fan assembly 3 includes at least two fans arranged along a height direction of the second end face, and the fans are uniformly distributed at the second end face. During use, the air-out area can be effectively ensured, the air-out efficiency is improved, the attenuation of air is avoided, and the effect of heat dissipation is ensured.

Specifically, more than 60% of the area of the second end face may be used for arranging the air outlet 5, or the aperture utilization area in the second end face may reach more than 90%, depending on the actual situation.

Figure 3:
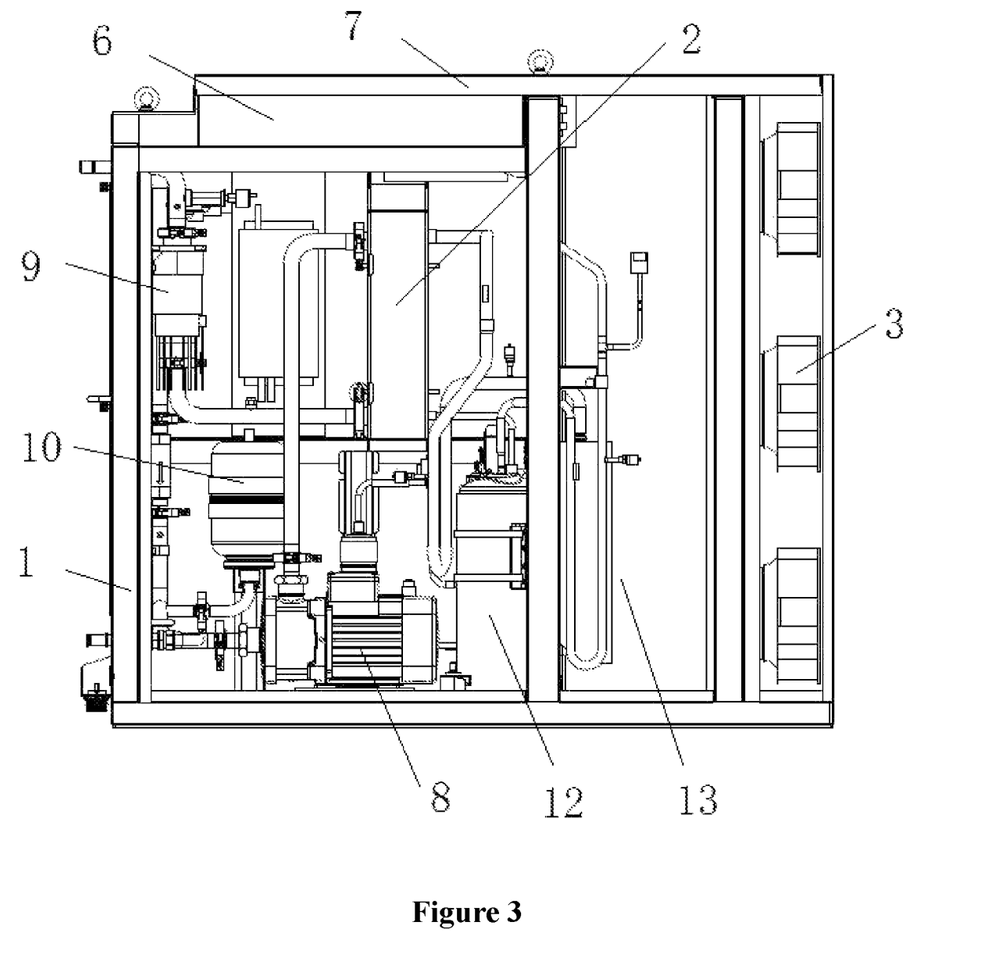
FIG. 3 is a front view of the refrigeration device in FIG. 1.

As shown in FIGS. 1 and 3, the fans are evenly distributed at the second end face, which is conducive to increasing the flow area of the airflow in the outer frame box 1, so that the flow rates of the airflow in parts of the outer frame box 1 are uniform, thereby improving the consistency of the effect of heat dissipation, and further improving the effect of heat dissipation.

Figure 8:
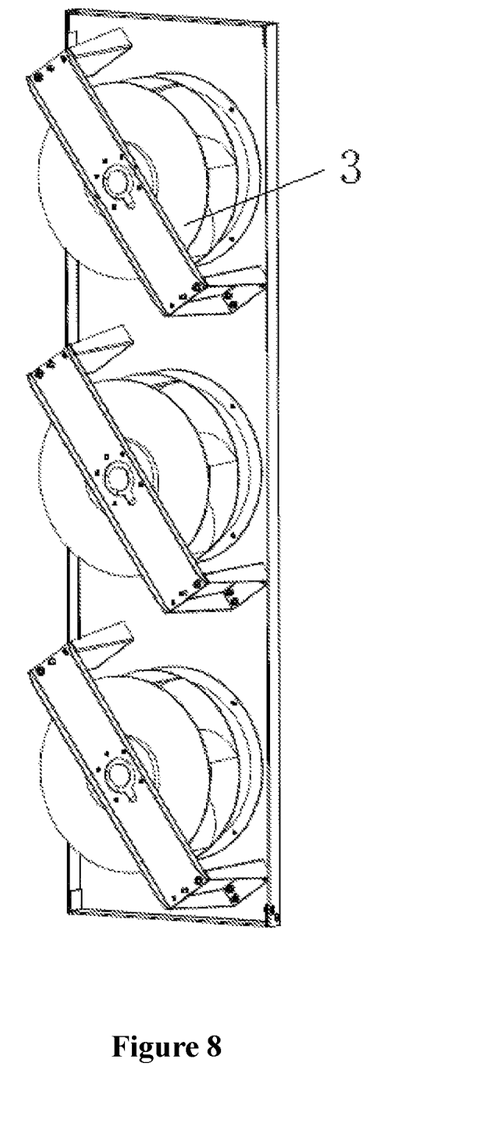
FIG. 8 is a structural schematic diagram of a fan assembly according to a specific embodiment provided by the present application.

As shown in FIG. 8, it is a structural schematic diagram of the fan assembly 3. The fan assembly 3 may be arranged as an independent modular structure and installed as a separate module in the outer frame box 1. In the process of the actual assembly, it is not required to assemble one piece by one piece in the outer frame box 1, the structure is simple, and the assembly and the disassembly are convenient.

In a specific embodiment, as shown in FIG. 3, the heat exchanger 2 is arranged in an upper-middle part of the outer frame box 1, and projections of the cooling liquid system and the refrigerant system to a bottom surface of the outer frame box 1 overlap a projection of the heat exchanger 2 to the bottom surface of the outer frame box 1.

In the process of actual arrangement, the heat exchanger 2 may be arranged in an upper part of the outer frame box 1, and the corresponding space below the heat exchanger 2 may be used to arrange the cooling liquid system and the refrigerant system, so that the layout of the cooling liquid system, the heat exchanger 2 and the refrigerant system in the outer frame box 1 is reasonable, improving space utilization and facilitating the miniaturization of the refrigeration device.

As shown in FIG. 1, it further includes an electrical control module 6 arranged at a top of the outer frame box 1. During the process of actual arrangement, the electrical control module 6 may be arranged as an independent modular structure. As a separate module, the electrical control module 6 may be arranged at the top of the outer frame box 1 after the assembly of other parts is completed, which is convenient for installation, disassembly, maintenance and replacement. Specifically, the electrical control module 6 may be connected to other parts through wiring harnesses and quick connection terminals.

An outer surface of the electrical control module 6 may also be covered with a cover plate 7. During use, rainwater may not easily drip to the electrical control module 6, improving the waterproof level, so as to ensure the safe use of electrical control module 6. The cover plate 7 may be one-piece structure or a separable structure, which is determined according to the actual situation.

For the convenience of installation, a lifting lug may be arranged on the cover plate 7, and the cover plate 7 is carried and moved by means of suspension.

Figure 7:
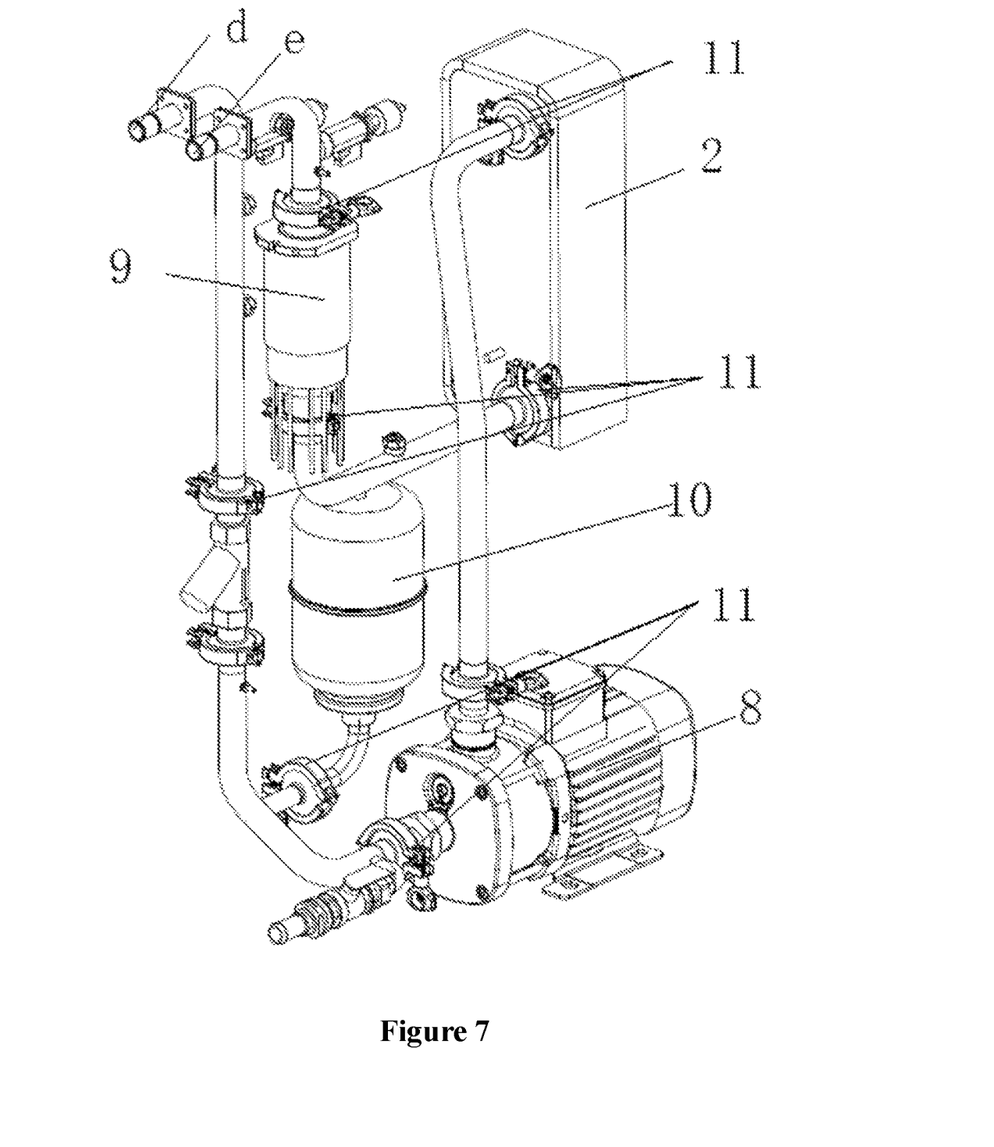
FIG. 7 is a structural schematic diagram of a cooling liquid system according to a specific embodiment provided by the present application.

As shown in FIG. 7, the cooling liquid system includes a water pump 8, a heater 9, an expansion tank 10 arranged at a water inlet end of the water pump 8 and connection pipelines. The heat exchanger 2 is connected between a water outlet end of the water pump 8 and a water inlet end of the heater 9. The connection pipelines may be arranged horizontally and/or vertically.

In the specific embodiment, the connection pipelines are arranged horizontally and/or vertically, so that the layout of the connection pipelines is relatively reasonable, the occurrence of bends is reduced, and the occupation space is reduced as much as possible, facilitating the arrangement with a small space. The connection pipelines are metal pipes or plastic pipes, which may be aluminum pipes or stainless steel pipes. Aluminum pipes can reduce weight, and stainless steel pipes can improve anti-corrosion performance, which may be selected according to needs.

As shown in FIG. 7, multiple chucks 11, multiple clamps and a sealing gasket are arranged at each joint of the connection pipelines. The multiple chucks 11 cooperate with the multiple clamps, and the sealing gasket is arranged between the multiple chucks 11 which are in a butt-connection, which can further improve the sealing effect and avoid sealing failure. Moreover, the sealing of end faces at the joints of the connection pipelines can be realized by the sealing method of the multiple chucks 11, the clamps and the sealing gaskets, which has a large sealing area and can achieve a good sealing effect on the cooling liquid and a good plasticity retention effect.

As shown in FIG. 7, a first connection port d and a second connection port e are configured to connect the cooling pipeline of the heating component, so that the pipeline in the cooling liquid system form a closed circulation pipeline, and there is no air leakage point in the entire pipeline. The cooling liquid is injected into the cooling liquid system by vacuuming, which ensures the cooling liquid system to be filled to a bubble-free state, and ensures the system to be filled with the circulation liquid, thereby ensuring the reliability of the operation of the system.

The heat exchanger 2 and the cooling liquid system may be combined into a modular structure as shown in FIG. 7. During installation, the structure shown in FIG. 7 may be arranged into the outer frame box 1 as a whole. Further, the connection wiring harnesses may also be set as a modular structure, which facilitates connection and makes the layout of the wiring harnesses in the outer frame box 1 relatively reasonable.

On the basis of the above embodiments, in order to further improve the weight reduction effect, the outer frame box 1 may be made of aluminum plate material. The outer frame box 1 may also be made of galvanized plate, stainless steel plate, etc., depending on the actual situation.

The terms "first" and "second" of the first connection port d and the second connection port e mentioned in the description are only for distinguishing different positions, and there is no sequence.

The various embodiments in the description are described in a progressive manner, and each of the embodiments focuses on the differences from other embodiments. For the same and similar parts of the embodiments, reference may be made to each other. Any combination of all the embodiments provided by the present application is within the protection scope of the present application, which is not repeated here.

The above provides a detailed introduction to the refrigeration device provided by the present application. Specific examples are used to illustrate the principles and implementations of the present application in the description. The description of the above embodiments is only used to help understand the method and the core idea of the present application. It should be pointed out that for those skilled in the art, some improvements and modifications can be made to the present application without departing from the principles of the present application, and the improvements and modifications also fall within the protection scopes of the claims of the present application.

What is claimed is:

1. A refrigeration device, comprising:
   an outer frame box;
   a refrigerant system, wherein a refrigerant circulates in the refrigerant system;
   a cooling liquid system, wherein a cooling liquid flows through a heating component and circulates in the cooling liquid system;
   a heat exchanger, wherein the refrigerant system and the cooling liquid system are connected to the heat exchanger, and the refrigerant and the cooling liquid exchange heat in the heat exchanger;
   a fan assembly, configured to provide power for a flow of airflow in the outer frame box;
   wherein the refrigerant system comprises a compressor, a condenser and an electronic expansion valve, and the cooling liquid system comprises a water pump, a heater, an expansion tank arranged at a water inlet end of the water pump and connection pipelines;
   the cooling liquid system, the heat exchanger, the refrigerant system and the fan assembly are sequentially arranged in the outer frame box along a flow direction of the airflow in the outer frame box;
   an air inlet is arranged in a first end face of the outer frame box, and the air outlet is arranged in a second end face of the outer frame box;
   the cooling liquid system, the heat exchanger, the refrigerant system and the fan assembly are sequentially arranged from the air inlet to the air outlet along the flow direction of the airflow; and
   the cooling liquid system is arranged close to the air inlet of the first end face, and the fan assembly is arranged close to the air outlet of the second end face.

2. The refrigeration device according to claim 1, wherein the air outlet occupies greater than 60% of an area of the second end face of the outer frame box;
   and/or, the fan assembly comprises at least two fans arranged along a height direction of the outer frame box, and the at least two fans are uniformly distributed in the height direction of the outer frame box.

3. The refrigeration device according to claim 1, wherein the heat exchanger is arranged in an upper-middle part of the outer frame box, and projections of the cooling liquid system and the refrigerant system to a bottom surface of the outer frame box overlap a projection of the heat exchanger to the bottom surface of the outer frame box.

4. The refrigeration device according to claim 1, further comprising an electrical control module, wherein the electrical control module is detachably arranged at a top of the outer frame box.

5. The refrigeration device according to claim 4, wherein an outer surface of the electrical control module is covered with a cover plate.

6. The refrigeration device according to claim 1, wherein the heat exchanger is connected between a water outlet end of the water pump and a water inlet end of the heater.

7. The refrigeration device according to claim 1, wherein the heat exchanger is connected between a water outlet end of the water pump and a water inlet end of the heater.

8. The refrigeration device according to claim 1, wherein the heat exchanger is connected between a water outlet end of the water pump and a water inlet end of the heater.

9. The refrigeration device according to claim 2, wherein the heat exchanger is connected between a water outlet end of the water pump and a water inlet end of the heater.

10. The refrigeration device according to claim 3, wherein the heat exchanger is connected between a water outlet end of the water pump and a water inlet end of the heater.

11. The refrigeration device according to claim 4, wherein the heat exchanger is connected between a water outlet end of the water pump and a water inlet end of the heater.

12. The refrigeration device according to claim 5, wherein the heat exchanger is connected between a water outlet end of the water pump and a water inlet end of the heater.

13. The refrigeration device according to claim 6, wherein a plurality of chucks, a clamp and a sealing gasket are arranged at each joint of the connection pipelines, the plurality of chucks cooperate with the plurality of clamps, and the sealing gasket is arranged between the plurality of chucks which are in a butt-connection.

14. The refrigeration device according to claim 1, wherein the outer frame box is made of aluminum plate material;
    and/or, the connection pipelines in the cooling liquid system are aluminum pipes.

15. The refrigeration device according to claim 1, wherein the outer frame box is made of aluminum plate material;
    and/or, the connection pipelines in the cooling liquid system are aluminum pipes.

16. The refrigeration device according to claim 2, wherein the outer frame box is made of aluminum plate material;
    and/or, the connection pipelines in the cooling liquid system are aluminum pipes.

17. The refrigeration device according to claim 3, wherein the outer frame box is made of aluminum plate material;
    and/or, the connection pipelines in the cooling liquid system are aluminum pipes.

18. The refrigeration device according to claim 4, wherein the outer frame box is made of aluminum plate material; and/or, the connection pipelines in the cooling liquid system are aluminum pipes.

* * * * *